Feb. 13, 1968   B. A. OTSAP   3,368,577
FLUID PRESSURE AMPLIFIER
Filed Dec. 4, 1964   4 Sheets-Sheet 1

BEN A. OTSAP,
INVENTOR.

BY R. E. Geangue
ATTORNEY

BEN A. OTSAP,
INVENTOR.

BEN A. OTSAP,
INVENTOR.

BY R. E. Geauque

ATTORNEY

Feb. 13, 1968  B. A. OTSAP  3,368,577
FLUID PRESSURE AMPLIFIER
Filed Dec. 4, 1964  4 Sheets-Sheet 4

BEN A. OTSAP,
INVENTOR.

BY R. E. Beaugur
ATTORNEY

United States Patent Office 3,368,577
Patented Feb. 13, 1968

3,368,577
FLUID PRESSURE AMPLIFIER
Ben A. Otsap, North Hollywood, Calif., assignor to The Marquardt Corporation, Van Nuys, Calif., a corporation of California
Filed Dec. 4, 1964, Ser. No. 415,943
8 Claims. (Cl. 137—81.5)

This invention relates to a fluid pressure amplifier and more particularly to a fluid pressure amplifier which utilizes a change in intensity and circulation of a vortex for amplification.

Pressure fluid amplifiers have depended upon the deflection of a power fluid stream by a side control jet in order to vary the flow direction of the power stream to the receiver. In another type of fluid amplifier, the control flow induces rotation in the power stream and a vortex is generated with a resultant high pressure drop from the outer circumference of the vortex chamber into the fluid outlet. Thus, the vortex amplifier reduces power flow rather than directing flow. The fluid amplifier of the present invention consists of a vortex chamber connected with a converging-diverging nozzle and three types of ports: signal, supply, and output. The supply pressure port and the output pressure port communicate with the throat of the nozzle while the input signal pressure port is located in the vortex chamber. The diverging part of the nozzle is vented to exhaust.

Supply fluid at constant pressure is injected into the throat area to produce a jet stream across the nozzle throat and an output pressure at the output port. Part of the flow from the supply port enters the vortex chamber and creates a vortex therein which results in a pressure gradient in the vortex chamber. At no input signal, the pressure level on both sides of the jet stream are equal resulting in no net deflection of the jet under equilibrium condition. A signal pressure entering the vortex chamber acts on the vortex present in the chamber changing its intensity and circulation, which, in turn, changes the static pressure level across the jet causing it to deflect. Deflection of the supply jet reduces the amount of flow entering the vortex chamber, and the jet will continue to deflect until an equilibrium condition is reached. At that point, the static pressure differential across the jet maintains the jet in the deflected position. When the signal is removed, the supply jet returns to its original position. The output pressure, therefore, varies in accordance with the deflection of the supply jet which is proportional to the level of the applied signal pressure. The net effect of the signal pressure upon the deflection of the jet stream is amplified by the votrex prior to its action on the jet stream. As a result, small changes in the signal pressure cause large changes in the output pressure level.

It is, therefore, an object of the present invention to provide a fluid pressure amplifier having a vortex chamber in which a vortex is continually produced by a supply pressure, said vortex being modified by a signal pressure to produce an amplified output pressure.

Another object of the invention is to provide a fluid pressure amplifier in which the pressure gradient in a vortex chamber controls the output pressure.

Another object of the present invention is to provide a fluid pressure amplifier in which the intensity and circulation of a vortex controls the static pressure across a jet and in which variation in the static pressure deflects the jet and changes the output pressure.

These and other objects of the invention not specifically set forth above will become readily apparent from the accompanying description and drawings in which.

Figure 1:
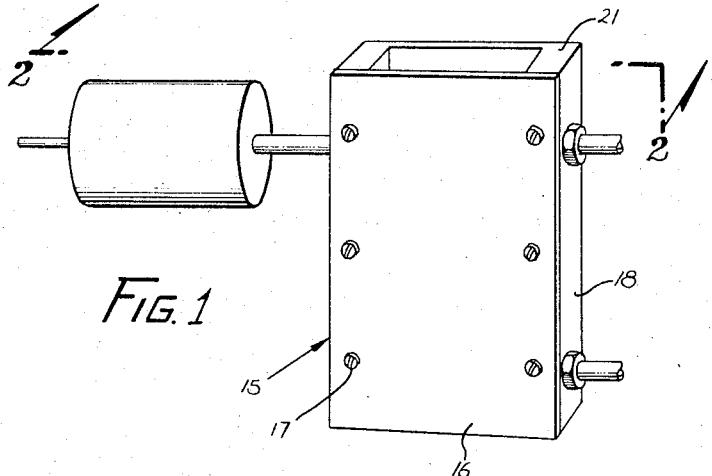
FIGURE 1 is a perspective view of the fluid pressure amplifier showing the ports connecting with the amplifier body.
Figure 2:
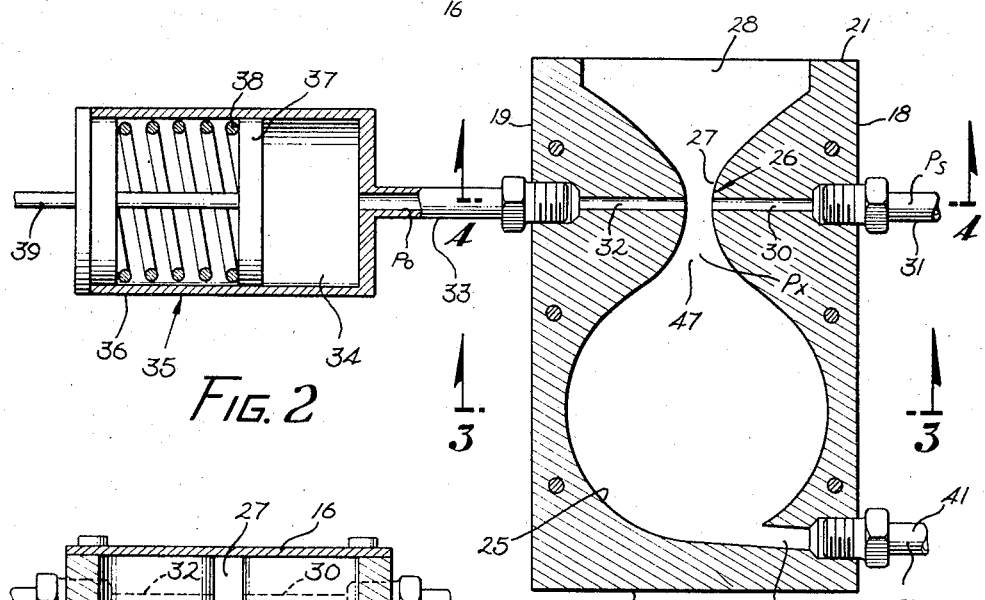
FIGURE 2 is a vertical section along line 2—2 of FIGURE 1 showing the vortex chamber connecting with the converging-diverging nozzle.
Figure 3:
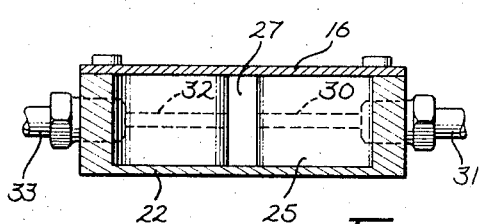
FIGURE 3 is a transverse section along line 3—3 of FIGURE 2.

Referring to the embodiment of the invention chosen for purposes of illustration, the fluid pressure amplifier consists of a solid body 15 which has a top cover plate 16 which is secured to the body by a plurality of screws 17. The body also has sides 18 and 19, ends 20 and 21, and bottom 22.

A cylindrical vortex chamber 25 is formed in the body 15 between the top cover plate 16 and bottom 22 and connects with a convergent-divergent nozzle 26 having throat 27 and an exit 28 located in the end 21. A supply pressure passage 30 extends transversely through the body 15 and terminates at the throat 27. A conduit 31 supplies the supply pressure $P_s$ to the passage 30 and connects therewith at side 18. An output pressure passage 32 contains output pressure $P_o$ and connects with the throat 27 of the nozzle opposite passage 30. A conduit 33 connects with passage 32 at side 19 of the body 15 and leads to chamber 34 of output device 35. The chamber 34 is formed by a housing 36 which contains a piston 37 operating against a spring 38. A control rod 39 is attached to the piston and is positioned thereby in accordance with the output pressure $P_o$ present in the chamber 34. A signal input pressure port 40 communicates tangentially with the side of the vortex chamber 25 and is supplied with a signal input pressure $P_i$ through the passage 41 which connects thereto at the side 18.

Figure 5:
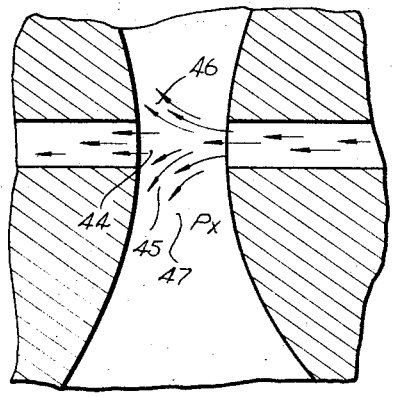
FIGURE 5 is an enlarged partial sectional view similar to FIGURE 2 showing the flow at the throat of the nozzle.

In operation, supply fluid at constant pressure is injected into the throat 27 at its narrowest portion through the supply passage 30 and produces a supply jet 44 transverse to the throat (see FIGURE 5). Since the output passage 32 is blocked, a portion 45 of fluid is diverted to the vortex chamber 25 creating a vortex therein and another portion 46 of the fluid is diverted to the exhaust port 28 of the nozzle while inducing the output pressure level in the output passage 32. The flow entering the vortex chamber creates the vortex which deflects the jet stream across the nozzle throat until reaching equilibrium condition under which the fluid entering the vortex chamber equals fluid leaving the chamber and the vortex is at a steady state condition. Fluid can be bled out of the vortex chamber through the space in the nozzle throat on each side of the jet stream 44.

The presence of a vortex in the chamber 25 results in a pressure gradient therein which produces a static pressure $P_x$ at point 47 adjacent the jet stream and pressure $P_x$ acts upon the fluid jet stream projecting across the nozzle throat from the supply passage. When no input signal is present in the signal passage 40, the pressure levels on both sides of the jet stream 44 across the throat are essentially equal resulting in no net deflection of the jet stream under equilibrium condition. Since there is a flow out of the vortex chamber above and below the jet, there is a pressure differential even though small. When an input pressure is introduced to the vortex chamber through the passage 40 in a direction counter to vortex rotation, the signal acts on the vortex present in the chamber changing its intensity and circulation, and increasing the static pressure $P_x$. This change in pressure $P_x$ changes the static pressure level across the jet 44 causing it to deflect towards the nozzle outlet 28. The deflection of the jet stream 44 reduces the amount of fluid flow entering the vortex chamber and the jet will continue to deflect towards the exit 28 until an equilibrium condition is reached. At the new condition of equilibrium, there is a static pressure differential across the jet 44 which maintains it in a deflected position. When the input signal is again removed, the supply jet returns to its original position. The output pressure in passage 32 therefore varies in accordance with the deflection of the supply jet 44, which deflection is caused by the level of the static pressure $P_x$ on the vortex side of the jet 44 which in turn is controlled by the input signal $P_i$. The relationship between the output pressure and the input signal $P_i$ is inversely proportional.

The net effect of the signal pressure in passage 40 upon the deflection of the jet stream 44 is amplified by the vortex prior to its action on the jet stream by the creation of static pressure $P_x$. The magnitude of the pressure $P_x$ results from the increase in the input pressure $P_i$ and from the static pressure developed by the vortex when acted upon by the signal pressure. As a result, small changes in the signal pressure cause large changes in the output pressure $P_o$ and the ratio of the output pressure change to signal pressure change is defined as the pressure gain of the amplifier.

In summary, an increase in the signal pressure $P_i$ operates to reduce the size of the vortex in the chamber 25 and to increase the static pressure $P_x$ at the throat, thereby causing the supply jet 44 to be deflected toward the nozzle exit and resulting in a reduction in the output pressure. The output pressure $P_o$ measured in the chamber 34 is static pressure proportional to the converted velocity pressure received by the output passage 32. Thus, by deflecting the jet stream 44, the velocity pressure in the output passage 32 is reduced thereby causing a reduction in the static pressure. Since an increase in the signal pressure $P_i$ does reduce the size of the vortex, it appears that this reduction in size results in a conversion of vortex velocity pressure to static pressure which causes static pressure $P_x$ to increase much more rapidly than the input signal pressure $P_i$. Thus, a significant increase in gain in the amplifier is obtained by the use of the vortex over the gain obtainable by use of signal pressure alone.

The effect of the static pressure $P_x$ on the jet stream 44 is the same as in conventional pressure fluid amplifiers so that the gain from the jet stream deflection is in the same order of magnitude as conventional type pressure amplifiers. There is very little flow across the jet stream amplifiers so that the amplification at this point is in the nature of a static rather than an ambient type of amplification.

Figure 6:
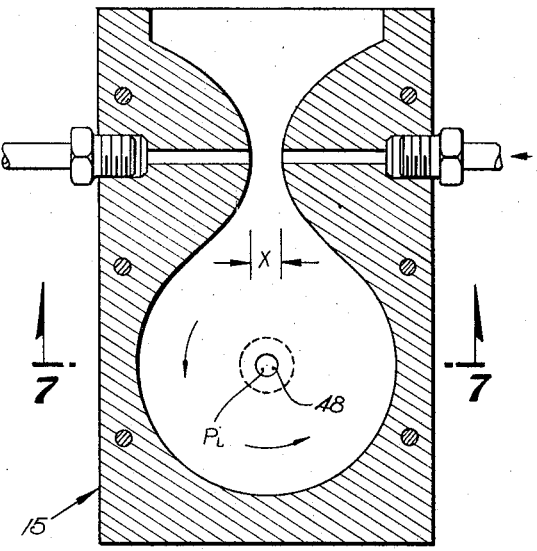
FIGURE 6 is a sectional view similar to FIGURE 2 of a modification in which the signal pressure is applied at the center of the vortex chamber.
Figure 7:
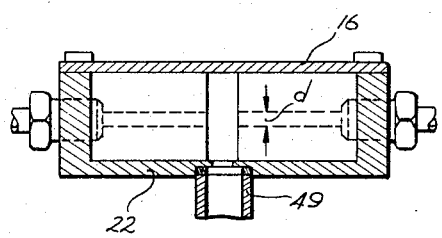
FIGURE 7 is a transverse section along line 7—7 of FIGURE 6.

A modification of the invention is shown in FIGURES 6 and 7 wherein the inlet signal pressure $P_i$ is introduced to the center of the vortices chamber at the inlet opening 48 in the bottom 22, the opening being connected with inlet pressure passage 49. An increase in the inlet pressure $P_i$ causes a reduction in the size of the vortices by forcing the vortices around the outside wall of the chamber 25. In another form of the invention, amplification of the inlet pressure $P_i$ results when the inlet pressure is introduced tangential to the chamber in the direction of rotation of the vortices. Thus, the invention contemplates the application of the input pressure to the vortex in various ways.

Figure 4:
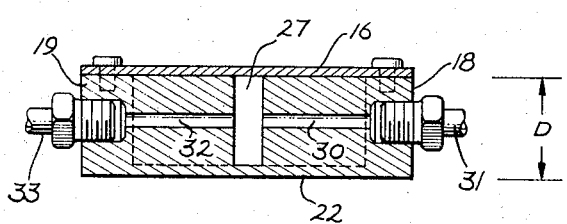
FIGURE 4 is a transverse section along line 4—4 of FIGURE 2.
Figure 8:
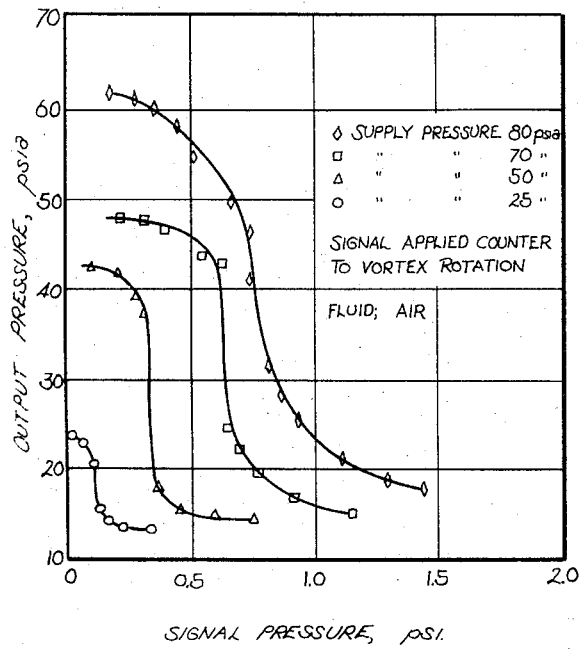
FIGURE 8 is a plot of output pressure against signal pressure applied counter to the direction of vortex rotation.
Figure 9:
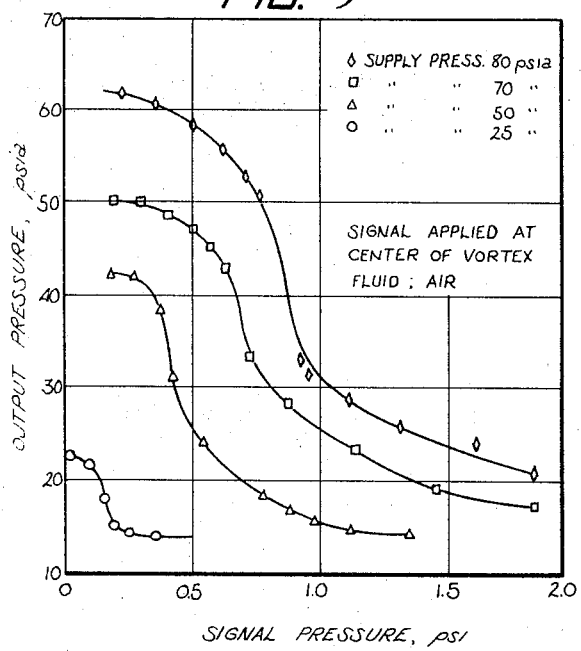
FIGURE 9 is a plot of output pressure against signal pressure applied at the center of vortex rotation.

In FIGURE 8, a plot of output pressure versus signal pressure is illustrated for four different supply pressures $P_s$, when the signal is supplied through the inlet passage 40 counter to the vortex rotation. In FIGURE 9, a similar plot is shown for four different supply pressures $P_s$ when the signal is applied to the center of the vortex. A comparison of FIGURES 8 and 9 illustrates that FIGURE 8 contains gain characteristics approaching S curve shape while FIGURE 9 reduces the gain but increases the operating range of inlet pressure. Since the various ways of signal pressure injection into the vortex will effect the output pressure, the location and direction of signal pressure injection is selected to provide the desired gain and operating range characteristics. The pressure gain characteristics presented in FIGURE 8 and FIGURE 9 are for block load conditions and other load conditions would result in modification of the design parameter. The curves of FIGURES 8 and 9 represent actual test data obtained from devices incorporating the present invention. Other tests on such devices have determined that the pressure recovery, response, and signal-to-noise ratio of the amplifiers of the present invention are within suitable operating ranges. The design parameter that influences the pressure recovery is $(X/d)$ where X is the throat width and $d$ is the supply passage diameter, and it has been found that the pressure recovery varies from 100% to 80% for pressure ratios of supply pressure to atmospheric pressure of 1 through 4. From frequency response tests and transient response tests, it is concluded that the transfer function of the vortex amplifier is a first order lag and appears to be independent of scaling. However, the time constant or break frequency is a function of the internal volume of the unit. By varying the major design parameters, such as throat depth D, throat width X and supply passage diameter $d$ shown in FIGURES 4, 6, and 7, respectively, it has been determined that the performances of the vortex amplifier can be adapted to numerous specific applications by carefully selecting the proper design parameters.

Figure 10:
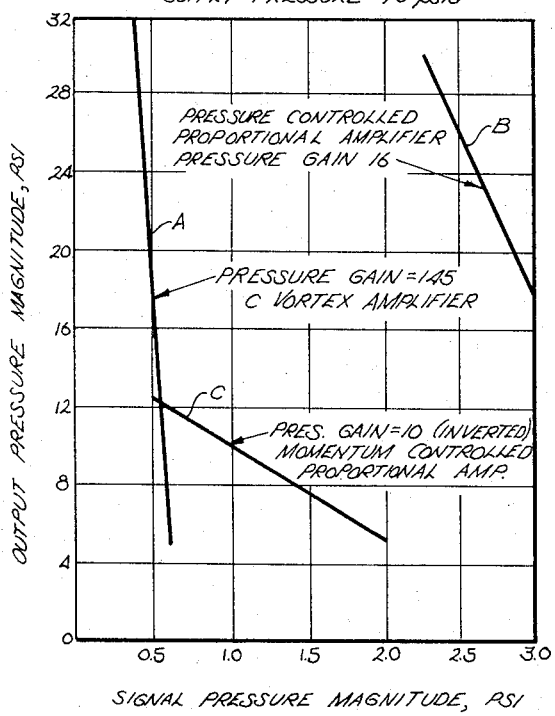
FIGURE 10 is a comparison of the pressure gain characteristics of the vortex fluid amplifier with pressure and momentum controlled amplifiers.

In order to compare the characteristics of the present vortex pressure fluid amplifier to conventional fluid amplifiers, the performance characteristics of two basic types of fluid amplifiers, namely, pressure controlled and momentum controlled, were investigated under a blocked load condition and compared using non-dimensional parameters. FIGURE 10 presents a comparison of the pressure gain of the three different types of amplifiers considering only the linear portion of the data for each type of device. The performance of the momentum-controlled unit are inverted to permit a uniform presentation of the data. The pressure gains of the pressure-controlled, momentum-controlled, and vortex-controlled were 9, 10, and 60, respectively at a supply pressure of 50 p.s.i.a. At a supply pressure of 70 p.s.i.a., the pressure gain were 16, 10, and 145, respectively. However, gains as high as 200 are obtainable with the vortex-controlled amplifier.

The response characteristics of the three types of fluid amplifiers were found to be similar, with the predominant factor controlling the time constant being the internal volume of each. A comparison of the signal-to-noise ratio of the three amplifiers as a function of frequency with constant supply pressure over the operating range of 0 to 20 c.p.s. showed that the signal-to-noise ratio for the vortex-controlled, pressure-controlled, momentum-controlled amplifiers were 30 db, 10 db, and 20 db. The pressure recovery characteristics were also investigated and as a function of pressure ratio. Pressure recovery varied from 100% to 54% for the pressure-controlled device, 100% to 54% for the momentum-controlled device, and 100% to 80% for the vortex-controlled device.

Figure 11:
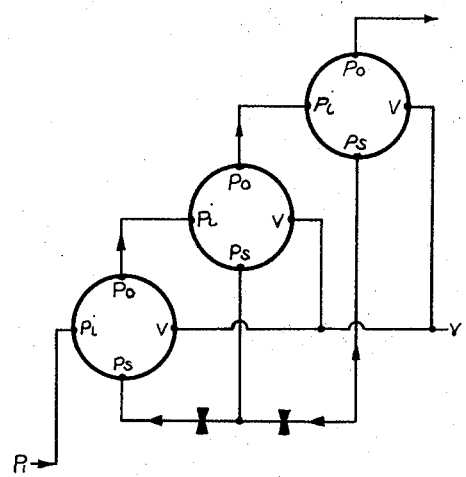
FIGURE 11 is a schematic illustration of a plurality of fluid pressure amplifiers in a three stage "series" connection circuit.
Figure 12:
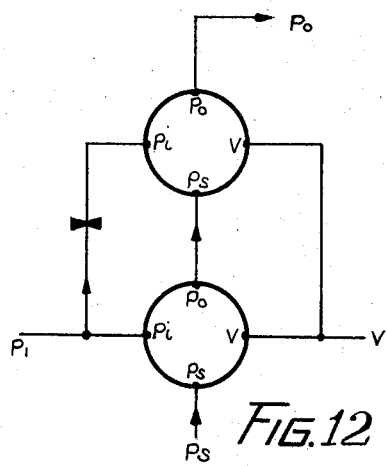
FIGURE 12 is a schematic illustration of a plurality of fluid pressure amplifiers in a two stage "parallel" connection circuit.

FIGURES 11 and 12 show the manner in which the vortex fluid amplifier of the present invention can be staged in "series" connected circuits or in "parallel" connection circuit. In these figures, the amplifiers are each shown schematically with an inlet pressure terminal, an output pressure terminal, a supply pressure terminal and an exhaust nozzle vent terminal labeled $P_i$, $P_o$, $P_s$, and $V$, respectively. In FIGURE 11, the amplifiers are cascaded in a three stage "series" connection circuit and the output pressure of the first stage is the input signal to the second stage, and so on. The number of stages which can be used will depend on the signal-to-noise ratio, the impedance matching, and the required amplification. Referring to FIGURE 12, two amplifiers are in a "parallel" connection circuit and the output pressure of the first stage serves as the power to the next stage, and the pressure signal is applied simultaneously to both stages. The number of stages to be used is determined by the pressure recovery characteristics. When the amplifiers are connected in a series inverted connection, the vent flow, which is inverted in polarity with respect to the output signal, is utilized as the input to each stage following the first stage. Utilizing this technique, it is possible to increase the network gains without a sign change.

Figure 13:
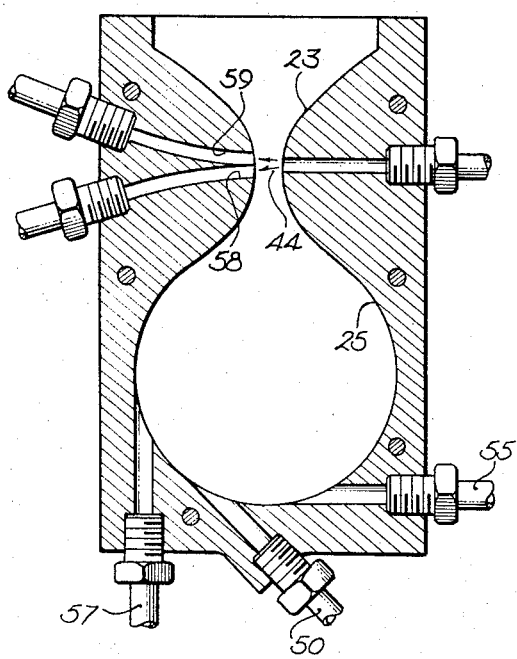
FIGURE 13 is a sectional view similar to FIGURE 2 of a modification having multiple signal input pressures and dual output pressures.

Referring to the modification shown in FIGURE 13, the vortex chamber 25 is connected with three signal input pressure ports 55, 56, and 57 each of which communicates tangentially with the side of the vortex chamber and introduces a pressure signal in a direction counter to vortex rotation. The signals will produce an additive effect on the output pressure so that the output pressure can be a function of a number of variable input pressure signals. The output pressure passage is divided into branches 58 and 59 which have their thin inlets side by side but lead to separate output locations. When the jet stream 44 is traveling straight across the throat 27 of the nozzle, substantially equal pressures will be present in each branch. However, as the total signal pressure increases, the resulting deflection of the jet stream will cause the pressure in branch 58 to decrease and the pressure in branch 59 to increase. When a plurality of input pressures are utilized, each pressure could be introduced to the vortex chamber in one of a number of ways to obtain a desired output characteristic.

Figure 14:
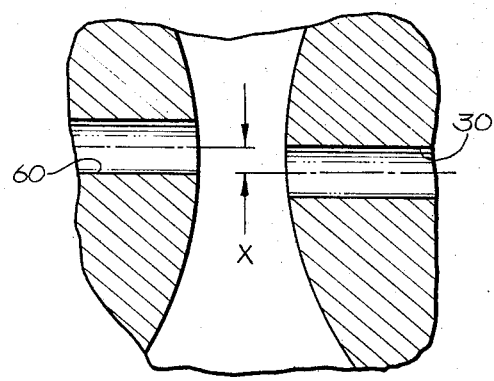
FIGURE 14 is a sectional view similar to FIGURE 2 of a modification having the output pressure passage offset from the input pressure passage.
Figure 15:
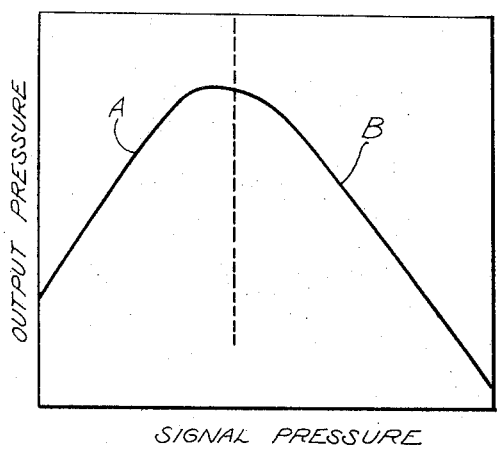
FIGURE 15 is an illustration of the variation in output pressure as a function of signal pressure for the modification of FIGURE 14.

In modification shown in FIGURE 14, the output pressure passage 60 is displaced from the supply pressure passage 30 toward the exit end of the nozzle so as to modify the gain curve and provide a gain such as shown in the curve of FIGURE 15. As the signal pressure increases from zero, the gain of curve portion A is positive since more and more of the jet stream 44 is deflected to the output passage 60. However, a peak in output will occur after which the gain will become negative as shown by curve portion B. It is therefore apparent that by proper location of the output passage 60 to one side or the other of the supply passage 30, the polarity of the gain can be varied.

By the present invention, there is provided a vortex pressure fluid amplifier in which a vortex is continually induced in a vortex chamber and the signal pressure is introduced to the vortex chamber to vary the static pressure across the supply jet. Since the gain capabilities of the vortex amplifier depend upon design parameters, such as throat width, depth, supply nozzle diameter, and direction of introducing the signal pressure, these various factors will be selected to produce the desired gain and operating range characteristics required from the amplifier. While the theoretical analysis of the vortex amplifier is exceedingly complicated, the operation of the device under actual system conditions utilizing compressed fluid and a blocked load provides performance criteria which exceeds the standard types of pressure amplifiers presently known. As has been indicated, the invention is generally related to the modification of vortex movement by injecting a signal pressure into the vortex and the manner in which the pressure is injected can be varied so long as the required increase in static pressure at the jet results. While the output pressure is shown as a blocked pressure, it is apparent that the device can operate under other load conditions wherein the vented portion is recovered by the output aperture and transmitted to the next stage. Also, while the supply pressure is shown as introduced at the narrowest portion of the throat, it can be introduced somewhat downstream or upstream of this narrowest portion and still provide an operative device, although the quality of operation holds up better when moved downstream than upstream. Various other modifications are contemplated by those skilled in the art without departing from the spirit and scope of the invention as hereinafter defined by the appended claims.

What is claimed is:
1. A fluid pressure amplifier comprising:
   a casing containing a cylindrical fluid chamber;
   a nozzle comprising a converging-diverging nozzle for connecting said chamber with exhaust pressure;
   a supply port for connecting a fluid supply source with the throat of said nozzle for producing a fluid jet stream across said throat and a vortex flow in said chamber;
   at least one output port connected with the throat of said nozzle substantially opposite said supply port for sensing an amplified output pressure; and
   at least one signal input port connected with said chamber for introducing at least one variable signal pressure into said vortex to vary the static pressure across said fluid stream and thereby deflect said stream in order to vary said amplified output pressure.

2. A fluid pressure amplifier as defined in claim 1 wherein said supply port has less depth than said throat to permit said vortex in said chamber to bleed past said fluid stream.

3. A fluid pressure amplifier as defined in claim 1 wherein said signal port comprises a passage directed tangentially to the outer circumference of said chamber and in opposition to the direction of rotation of said vortex.

4. A fluid pressure amplifier a defined in claim 1 wherein said signal port comprises a passage directed transversely into said vortex at the center thereof.

5. A fluid pressure amplifier as defined in claim 1, including a plurality of output ports.

6. A fluid pressure amplifier as defined in claim 1, including a plurality of signal input ports.

7. A fluid pressure amplifier as defined in claim 1, including a plurality of output ports and a plurality of signal input ports.

8. A fluid pressure amplifier comprising:
   a casing containing a cylindrical fluid chamber;
   a converging-diverging nozzle for connecting said chamber with exhaust pressure;
   a supply port for connecting a fluid supply source with the throat of said nozzle for producing a fluid jet stream across said throat and a vortex flow in said chamber;
   at least one output port connected with the throat of said nozzle and offset from said supply port for sensing an amplified output pressure; and
   at least one signal input port connected with said chamber for introducing at least one variable signal pressure into said vortex to vary the static pressure across said fluid stream and thereby deflect said stream in order to vary said amplified output pressure.

References Cited

UNITED STATES PATENTS

| | | | |
|---|---|---|---|
| 3,158,166 | 11/1964 | Warren | 137—81.5 |
| 3,192,938 | 7/1965 | Bauer | 137—81.5 |
| 3,193,197 | 7/1965 | Bauer | 137—81.5 X |
| 3,195,303 | 7/1965 | Widell | 137—81.5 X |
| 3,217,626 | 11/1965 | Spyropoules | 137—81.5 |
| 3,219,048 | 11/1965 | Palmisano | 137—81.5 |

M. CARY NELSON, *Primary Examiner.*

S. SCOTT, *Assistant Examiner.*